(No Model.)
C. C. KING.
STORM APRON FOR VEHICLES.
No. 362,012. Patented Apr. 26, 1887.
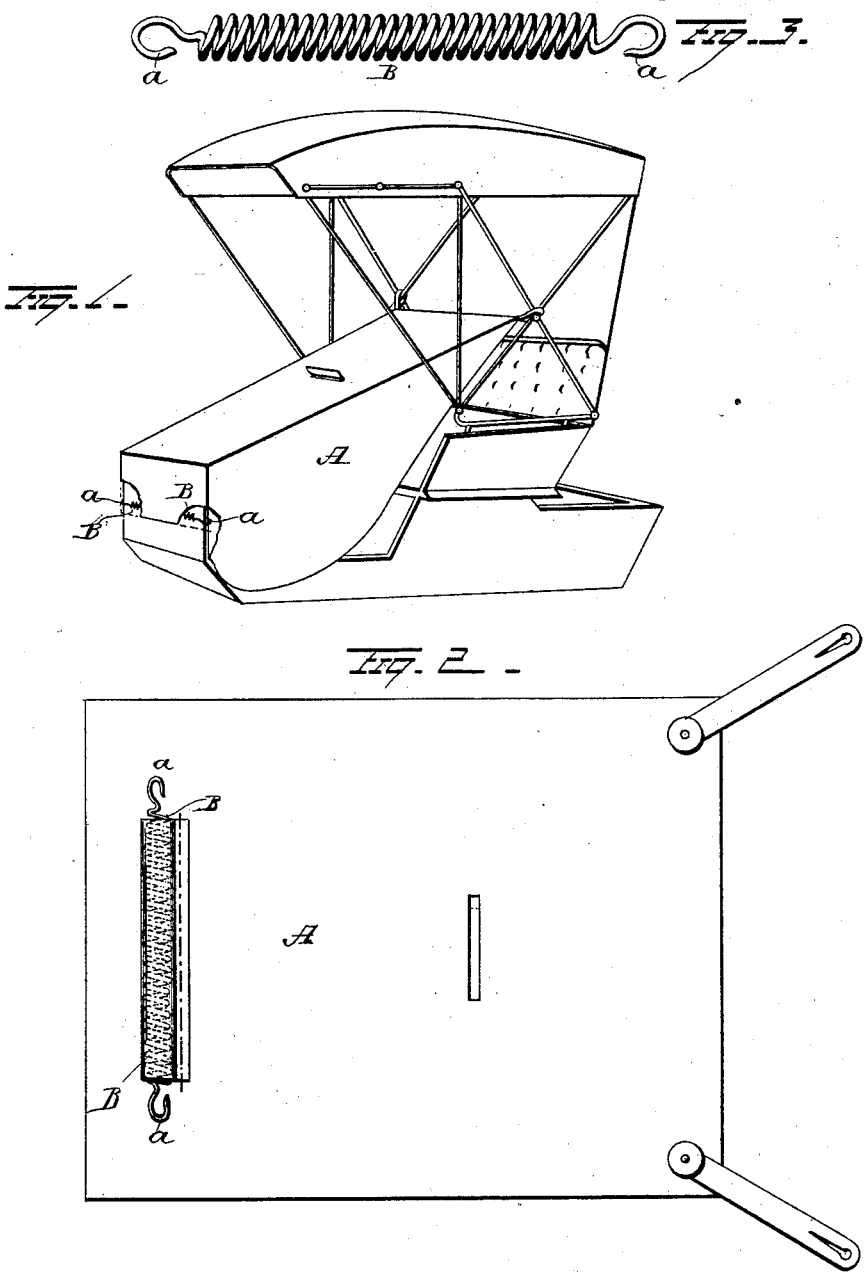
WITNESSES
G. F. Downing
S. G. Nottingham
INVENTOR
C C King
by his Attorney

UNITED STATES PATENT OFFICE.

CORYDON CADWELL KING, OF PITTSTON, PENNSYLVANIA, ASSIGNOR OF TWO-THIRDS TO JOHN W. NIMMO, OF SAME PLACE.

STORM-APRON FOR VEHICLES.

SPECIFICATION forming part of Letters Patent No. 362,012, dated April 26, 1887.

Application filed October 4, 1886. Serial No. 215,264. (No model.)

*To all whom it may concern:*

Be it known that I, CORYDON CADWELL KING, of Pittston, in the county of Luzerne and State of Pennsylvania, have invented certain new and useful Improvements in Storm-Aprons for Wheeled Vehicles; and I do hereby declare the following to be a full, clear, and exact description of the invention, such as will enable others skilled in the art to which it appertains to make and use the same.

My invention relates to storm-aprons for carriages or other wheeled passenger-vehicles.

The nature and object of the improvement is to provide an apron that can be quickly attached to the dash-board of a vehicle in a secure and simple manner, the means of attachment made readily adjustable to different widths of dash-boards, and also permit the apron to be lowered in secured position at the sides of the vehicle to afford adequate protection to the occupants, and, lastly, produce an efficient, convenient, and durable article for the purpose designed at a low initial cost.

With these ends in view my invention is embraced in certain features of construction and combination of parts, as will be hereinafter described, and pointed out in the claims.

In the drawings making a part of this specification, Figure 1 is a perspective view of a storm-apron in position on a vehicle. Fig. 2 is a view of the under side of an apron with the securing-clasp shown in proper position on same. Fig. 3 is a view of the double-hook spring-clasp.

Referring to the drawings by letter, A is the storm-apron. This is made of enameled cloth or other proper water-proof material. It is preferably made with a flap-covered slit in the material, that is located at a proper point for the insertion through the same of the driving-reins, the size of the apron being proportioned to properly protect the user.

At a point midway between the side edges of the apron, and upon its inner surface at the lower edge of same, a spring-clasp, B, is secured in a casing, made of leather or the same material as that of which the apron is manufactured. This spring is provided with hooks *a a*, that are turned upon its ends, or made of sheet-plate, and secured to said ends by any suitable means. These bent portions are intended to hook over the side edges of the dash-rim, or outer guard-iron of same. The spring is preferably made of elastic wire wound spirally and of a sufficient length to extend across the dash-board and attach to its side edges, as just stated, without improper distention of its coils or injury to its resilience. It is also feasible to employ an elastic gum spring of proper strength and form for the purpose.

Heretofore storm-aprons have been made provided with clamps having set-screws in same to attach them to the top edge of the rim of the dash-board. This device is defective in that it is inconvenient to attach as well as release from the dash-board, and to a certain extent the use of the device in this form is dangerous, as in case the animals attached to the vehicle are fractious, or become frightened and kick or run away, the occupants of the vehicle are endangered from inability to quickly disengage the apron at its connecting-points on the top of the dash-board.

An inspection of my improved apron will show that this defect is fully obviated, as the hooked connection on the dash-board can be instantly detached at either or both sides and the apron removed so as to permit the vacation of the vehicle, if necessary.

Another advantage is that the edges of the apron at each side of the dash-board can be moved upon the side rim of the same while in hooked connection, so that the feet of the occupants can be properly and closely covered and the sides of the vehicle at the foot-board secured from the effects of storms and mud splashing from the wheels.

Another advantage obtained by the raising and lowering of the position of the dash-hooks is the avoidance of a constant wear in one place on the apron of the lines, and the convenience of and facility for adjustment of the apron upon both sides.

Having fully described my invention, what I claim as new, and desire to secure by Letters Patent, is—

1. The combination, with a storm-apron, of a longitudinally-extensible spring loosely secured to the under side of the apron and provided at its ends with hooks, substantially as set forth.

2. The combination, with a storm-apron provided on its lower face with a pocket open at both ends, of a spring loosely seated within said pocket and provided with hooks on its ends, substantially as set forth.

3. The combination, with an apron having a casing or pocket, of a spring located within said pocket and provided with hooks on its ends, substantially as set forth.

In testimony whereof I have signed this specification in the presence of two subscribing witnesses.

CORYDON CADWELL KING.

Witnesses:
S. P. FENN,
F. H. KYTE.